(12) United States Patent
Karig et al.

(10) Patent No.: US 10,822,358 B2
(45) Date of Patent: Nov. 3, 2020

(54) PROCESS FOR PREPARING PHOSPHORUS-CONTAINING ALPHA-AMINONITRILES

(71) Applicant: BASF SE, Ludwigshafen am Rhein (DE)

(72) Inventors: Gunter Karig, Frankfurt am Main (DE); Frank Memmel, Leverkusen (DE); Mark James Ford, Leverkusen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/631,900

(22) PCT Filed: Jun. 20, 2018

(86) PCT No.: PCT/EP2018/066402
§ 371 (c)(1),
(2) Date: Jan. 17, 2020

(87) PCT Pub. No.: WO2019/015909
PCT Pub. Date: Jan. 24, 2019

(65) Prior Publication Data
US 2020/0157128 A1    May 21, 2020

(30) Foreign Application Priority Data
Jul. 21, 2017   (EP) ..................... 17182645

(51) Int. Cl.
*C07F 9/46*    (2006.01)
(52) U.S. Cl.
CPC ..................... *C07F 9/46* (2013.01)
(58) Field of Classification Search
None
See application file for complete search history.

(56) References Cited

U.S. PATENT DOCUMENTS

| 4,168,963 A | 9/1979 | Rupp et al. |
| 4,521,348 A | 6/1985 | Finke et al. |
| 4,599,207 A | 7/1986 | Lachhein et al. |
| 4,692,541 A | 9/1987 | Zeiss et al. |
| 6,359,162 B1 | 3/2002 | Willms |
| 9,850,263 B2 * | 12/2017 | Ressel ..................... C07F 9/301 |

FOREIGN PATENT DOCUMENTS

| CA | 1231103 A | 1/1988 |
| CN | 102399240 A | 4/2012 |
| CN | 103483379 A | 1/2014 |
| CN | 105481894 A | 4/2016 |
| DE | 2717440 A1 | 12/1977 |
| WO | WO-2015/173146 A1 | 11/2015 |
| WO | WO-2017/037009 A1 | 3/2017 |
| WO | WO-2017/037012 A1 | 3/2017 |
| WO | WO-2017/037033 A1 | 3/2017 |
| WO | WO-2017/037034 A1 | 3/2017 |

OTHER PUBLICATIONS

European Search Report for EP Patent Application No. 17182645.6, dated Dec. 15, 2017, 3 pages.
International Search Report for PCT Patent Application No. PCT/EP2018/066402, dated Aug. 22, 2018, 4 pages.

* cited by examiner

*Primary Examiner* — Amy C Bonaparte
(74) *Attorney, Agent, or Firm* — Marshall, Gerstein & Borun LLP

(57) ABSTRACT

The present invention relates primarily to processes for preparing particular phosphorus-containing α-aminonitriles of the formulae (Ia) and (Ib) defined hereinafter from corresponding phosphorus-containing cyanohydrin esters and to the use thereof for preparation of glufosinate or of glufosinate salts. The present invention further relates to a process for preparing glufosinate or glufosinate salts.

20 Claims, No Drawings

PROCESS FOR PREPARING PHOSPHORUS-CONTAINING ALPHA-AMINONITRILES

This application is a National Stage application of International Application No. PCT/EP2018/066402 filed Jun. 20, 2018. This application also claims priority under 35 U.S.C. § 119 to EP Patent Application No. 17182645.6, filed Jul. 21, 2017.

Process for Preparing Phosphorus-Containing α-Aminonitriles

The present invention relates primarily to processes for preparing particular phosphorus-containing α-aminonitriles of the formulae (Ia) and (Ib) defined hereinafter from corresponding phosphorus-containing cyanohydrin esters and to the use thereof for preparation of glufosinate or of glufosinate salts. The present invention further relates to a process for producing glufosinate/glufosinate salts.

Phosphorus-containing cyanohydrin esters are valuable intermediates in various industrial fields, in particular for preparation of biologically active substances which can be employed in the pharmaceutical/agrochemical sector.

U.S. Pat. No. 4,168,963 describes the preparation of various phosphorus-containing and herbicidally active compounds, among which in particular phosphinothricin (2-amino-4-[hydroxy (methyl)phosphinoyl]butanoic acid; common name: glufosinate, referred to hereinafter as glufosinate) and the salts thereof have attained commercial significance in the agrochemical sector.

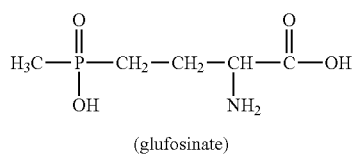

(glufosinate)

Methods for preparation of intermediates for synthesis of such phosphorus-containing herbicidally active compounds, in particular of glufosinate, are described in U.S. Pat. Nos. 4,521,348, 4,599,207 and 6,359,162 B1, for example. Publications WO 2015/173146, WO 2017/037033, WO 2017/037034, WO 2017/037009 and WO 2017/037012 describe further-improved process variants for preparation of phosphorus-containing cyanohydrins or cyanohydrin esters.

CA1231103 (corresponding to EP 0 121 226) describes a process for preparing phosphinothricin by treatment of 4-(hydroxymethylphosphinyl)-2-oxobutyric acid in the presence of a hydrogenation catalyst in a hydrogen atmosphere with ammonia or primary amines.

U.S. Pat. No. 4,521,348 (corresponding to EP 0 011 245) primarily describes processes for preparing phosphorus-containing cyanohydrin derivatives and, with reference to published specification DE 27 17 440 (corresponding to U.S. Pat. No. 4,168,963), the schematic reaction of isobutyl (3-cyano-3-hydroxypropyl) methylphosphinate with ammonia and water (similarly to the manner in WO 2015/173146).

U.S. Pat. No. 4,692,541 discloses processes for preparing phosphorus-containing α-aminonitriles by reaction of acylals with alkali metal cyanides under Strecker synthesis conditions using ammonium chloride ($NH_4Cl$) and concentrated aqueous ammonia solution (about 25%). This document further states that, by the process described in U.S. Pat. No. 4,521,348 (corresponding to EP 0 011 245), after the reaction of isobutyl (3-cyano-3-acetoxypropyl)methylphosphinate with 1.) $NH_3$, then with 2.) KOH and 3.) $H_2SO_4$, glufosinate is obtained in a yield of about 85%.

CN102399240A describes an improved process for preparing glufosinate-ammonium, including the reaction of acrolein cyanohydrin acetate with ethyl methyl phosphinate in the presence of a free-radical former, followed by aminolysis of the crude product obtained with a mixture of ammonium chloride ($NH_4Cl$) and 25% aqueous ammonia to give the α-aminonitrile.

The processes from the prior art for preparation of phosphorus-containing α-aminonitriles from corresponding phosphorus-containing cyanohydrin esters do allow the preparation of the desired phosphorus-containing α-aminonitriles, sometimes in very good yield, but still have disadvantages in relation to employability on the industrial production scale, for example excessively low space-time yields, high stoichiometric use of starting materials such as ammonia, too high a proportion of co-products or by-products (and the associated disposal, for example wastewater treatment) and excessively high complexity in the purification and isolation of the phosphorus-containing α-aminonitriles (for example as a result of the undesirably high salt burden and the complexity necessary in the filtration as a result).

The problem addressed by the present invention was therefore that of finding a process for preparing phosphorus-containing α-aminonitriles from corresponding phosphorus-containing cyanohydrin esters which affords the phosphorus-containing α-aminonitriles in at least comparable or better chemical yield compared to the prior art processes and improves one, more than one or all of the aforementioned disadvantages, especially allows an improved space-time yield, enables reduced use of starting materials such as ammonia, a lower proportion of co- or by-products, and preferably an improved reaction regime, for example in relation to economic, environmentally relevant and/or quality-relevant aspects.

This problem is solved by the process according to the invention described hereinafter.

The present invention provides a process for preparing a mixture comprising at least one compound of the formula (Ia) and at least one compound of the formula (Ib)

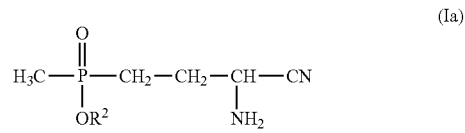

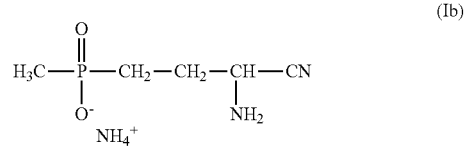

wherein a compound of the formula (II)

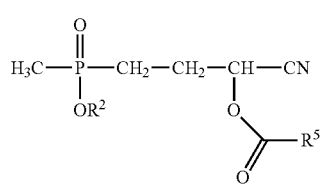

is reacted with NH$_3$, using a total of 2.0-3.5 molar equivalents of NH$_3$, based on the amount of compounds of the formula (II) used,
wherein in each case:
R$^2$ is (C$_1$-C$_{12}$)-alkyl, (C$_1$-C$_{12}$)-haloalkyl, (C$_6$-C$_{10}$)-aryl, (C$_6$-C$_{10}$)-haloaryl, (C$_7$-C$_{10}$)-aralkyl, (C$_7$-C$_{10}$)-haloaralkyl, (C$_4$-C$_{10}$)-cycloalkyl or (C$_4$-C$_{10}$)-halocycloalkyl,
R$^5$ is (C$_1$-C$_{12}$)-alkyl, (C$_1$-C$_{12}$)-haloalkyl, (C$_6$-C$_{10}$)-aryl, (C$_6$-C$_{10}$)-haloaryl, (C$_7$-C$_{10}$)-aralkyl, (C$_7$-C$_{10}$)-haloaralkyl, (C$_4$-C$_{10}$)-cycloalkyl or (C$_4$-C$_{10}$)-halocycloalkyl.

By the processes according to the invention, especially in one of the configurations of the processes according to the invention described as preferred and as particularly preferred, the mixtures comprising the phosphorus-containing α-aminonitriles of the formulae (Ia) and (Ib) are prepared with an improved space-time yield, reduced use of starting materials such as ammonia, improved process economy (for example improved workup of the reaction through reduced filtration complexity), a smaller proportion of co- or by-products, and hence with an improved reaction regime.

Overall, the processes according to the invention, including the further process according to the invention described hereinafter for preparation of glufosinate, give rise to fewer unwanted co- and by-product components with reduced use of starting materials, and so the processes according to the invention are more efficient and more energy-saving.

The respective alkyl radicals of the radicals R$^2$ and R$^5$ may have a straight-chain or branched-chain (branched) carbon skeleton.

The expression "(C$_1$-C$_4$)-alkyl" is the brief notation for an alkyl radical having 1 to 4 carbon atoms, i.e. encompasses the radicals methyl, ethyl, 1-propyl, 2-propyl, 1-butyl, 2-butyl, 2-methylpropyl or tert-butyl. General alkyl radicals having a larger specified range of carbon atoms, for example "(C$_1$-C$_6$)-alkyl", correspondingly also encompass straight-chain or branched alkyl radicals having a greater number of carbon atoms, i.e. in this example also the alkyl radicals having 5 and 6 carbon atoms.

The expression "(C$_4$-C$_5$)-alkyl" is the brief notation for an alkyl radical having 4 or 5 carbon atoms, i.e. encompasses the n-butyl, isobutyl, sec-butyl, tert-butyl, n-pentyl, isopentyl, sec-pentyl and neopentyl radicals.

"Halogen" preferably refers to the group consisting of fluorine, chlorine, bromine and iodine. Haloalkyl, haloaryl, haloaralkyl and halocycloalkyl respectively refer to alkyl, aryl, aralkyl and cycloalkyl partially or completely substituted by identical or different halogen atoms, preferably from the group fluorine, chlorine and bromine, in particular from the group fluorine and chlorine. Thus haloalkyl encompasses for example monohaloalkyl (=monohalogenalkyl), dihaloalkyl (=dihalogenalkyl), trihaloalkyl (=trihalogenalkyl) or else perhaloalkyl, for example CF$_3$, CHF$_2$, CH$_2$F, CF$_3$CF$_2$, CH$_2$FCHCl, CCl$_3$, CHCl$_2$, CH$_2$CH$_2$Cl. The same applies for the other halogen-substituted radicals.

The preparation of the phosphorus-containing cyanohydrin esters of the formula (II) is known to those skilled in the art and can be effected by methods known from the literature (for example according to the documents cited at the outset).

For the formulae (Ia) and (II) in connection with the processes according to the invention, it is preferably the case that
R$^2$ is (C$_3$-C$_6$)-alkyl, and
R$^5$ is (C$_1$-C$_4$)-alkyl, (C$_6$-C$_8$)-aryl or (C$_5$-C$_8$)-cycloalkyl.

For the formulae (Ia) and (II) in connection with the processes according to the invention, it is more preferably the case that
R$^2$ is (C$_4$-C$_5$)-alkyl, and
R$^5$ is methyl, ethyl or isopropyl.

For the formulae (Ia) and (II) in connection with the process according to the invention, it is especially preferably the case that
R$^2$ is n-butyl, isobutyl, n-pentyl or isopentyl, and
R$^5$ is methyl.

For the formulae (Ia) and (II) in connection with the process according to the invention, it is especially preferably the case that
R$^2$ is n-butyl, and
R$^5$ is methyl.

The process according to the invention is preferably conducted in such a way that a total amount of 2.0 to 3.0 molar equivalents of NH$_3$ is used, based on the amount of compounds of the formula (II) used.

The process according to the invention is more preferably conducted in such a way that a total amount of 2.3 to 2.8 molar equivalents of NH$_3$ is used, based on the amount of compounds of the formula (II) used.

The process according to the invention is especially preferably conducted in such a way that a total amount of 2.4 to 2.7 molar equivalents of NH$_3$ is used, based on the amount of compounds of the formula (II) used.

The process according to the invention is preferably conducted in such a way that the NH$_3$ used is essentially anhydrous, since the advantages of the processes according to the invention mentioned at the outset, especially in relation to an improved space-time yield, reduced use of starting materials such as ammonia, a lower proportion of co- or by-products, and an improved reaction regime, can be achieved to a particular degree.

In connection with the processes according to the invention, the NH$_3$ used is preferably essentially anhydrous, meaning that the water content in the NH$_3$ used is not more than 1% by weight, and is regularly in the range of 0.1-0.5% by weight.

The process according to the invention is preferably conducted in such a way that the reaction is effected without addition of ammonium chloride (NH$_4$Cl).

In-house experiments have shown that the addition of ammonium chloride (NH$_4$Cl) does not have any advantageous effects on the process according to the invention and in that respect is dispensable. Since the further preparation of glufosinate and salts thereof, by the processes known in the literature, generally includes a filtration step for removal of by- or co-products in salt form that have been formed in the course of the reaction, dispensing with the addition of ammonium chloride in processes according to the invention means a further improvement in the reaction regime, particularly with regard to a later filtration.

The process according to the invention is preferably conducted in such a way that one or more compounds of formula (II) as defined above, preferably one or more of the compounds of the formula (II) defined as preferred or particularly preferred, are initially charged in the reactor in liquid form, and NH$_3$ is added.

In a preferred configuration, the addition can be effected in such a way that $NH_3$, which is generally in gaseous, liquid or partly gaseous and partly liquid form under the process conditions, is metered in partly or completely beneath the surface of the liquid phase comprising the initially charged compound(s) of the formula (II).

The process according to the invention is preferably conducted in such a way that the reaction is effected at a temperature in the range from 0 to 70° C., preferably at a temperature in the range from 10 to 60° C.

The process according to the invention is more preferably conducted in such a way that the reaction is effected at a temperature in the range from 15 to 50° C., more preferably at a temperature in the range from 20 to 45° C.

The mixtures comprising the phosphorus-containing α-aminonitriles of the formulae (Ia) and (Ib) that have been formed in accordance with the invention can be used as starting materials for synthesis of phosphorus-containing amino acids, for example glufosinate (such a synthesis route is described in detail further down).

It is further possible to conduct the process according to the invention under elevated pressure or under reduced pressure.

The process according to the invention is preferably conducted in such a way that the reaction is effected at an absolute pressure (pabs) of not more than 5 bar, preferably at an absolute pressure of not more than 4 bar, further preferably at an absolute pressure in the range from 970 mbar to 3 bar.

According to the choice of reaction parameters (especially molar ratio of compounds of the formula (II) and $NH_3$, the amount of water present in the reaction and the associated reaction temperature and reaction time), the mixture prepared in accordance with the invention contains different proportions of compounds of the formula (Ia) and of the formula (Ib). The proportion of the compound (Ia) is regularly 10 to 90 mol %, and the proportion of the compound (Ia) is usually 20 to 80 mol %, based in each case on the total amount of compounds of the formulae (Ia) and (Ib).

Under the present preferred and particularly preferred reaction conditions, the proportion of the compound (Ia) is regularly 30 to 80 mol %, the proportion of the compound (Ia) is frequently 40 to 80 mol %, and the proportion of the compound (Ia) is usually 50 to 80 mol %, based in each case on the total amount of compounds of the formulae (Ia) and (Ib).

According to the reaction procedure, especially reaction time and amount of $NH_3$ used, the proportion of the compound (Ia) may be 60 mol % or more, or else 70 mol % or more, based in each case on the total amount of compounds of the formulae (Ia) and (Ib).

The process according to the invention for preparation of the mixtures comprising the phosphorus-containing α-aminonitriles of the formulae (Ia) and (Ib) is preferably applicable to the formulae (Ia) and (II) in which
$R^2$ is $(C_4$-$C_5)$-alkyl, and
$R^5$ is methyl, ethyl or isopropyl,
using a total of 2.0 to 3.5 molar equivalents of $NH_3$, based on the amount of compounds of the formula (II) used,
where the reaction is effected at a temperature in the range from 0 to 70° C., preferably at a temperature in the range from 10 to 60° C.,
where preferably one, more than one or all of the following parameters are additionally applicable:
the reaction is effected without addition of ammonium chloride ($NH_4Cl$),
the $NH_3$ used is essentially anhydrous, and/or
the reaction is effected at an absolute pressure (pabs) of not more than 5 bar.

The process according to the invention for preparation of the mixtures comprising the phosphorus-containing α-aminonitriles of the formulae (Ia) and (Ib) is preferably applicable to the formulae (Ia) and (II) in which
$R^2$ is $(C_4$-$C_5)$-alkyl, and
$R^5$ is methyl, ethyl or isopropyl,
using a total of 2.0 to 3.0 molar equivalents of $NH_3$, based on the amount of compounds of the formula (II) used,
where the reaction is effected at a temperature in the range from 10° C. to 60° C.,
the reaction is effected without addition of ammonium chloride ($NH_4Cl$),
the $NH_3$ used is essentially anhydrous, and
the reaction is effected at an absolute pressure (pabs) of not more than 5 bar.

The process according to the invention for preparation of the mixtures comprising the phosphorus-containing α-aminonitriles of the formulae (Ia) and (Ib) is especially preferably applicable to the formulae (Ia) and (II) in which
$R^2$ is n-butyl, isobutyl, n-pentyl or isopentyl (preferably in turn n-butyl), and
$R^5$ is methyl,
using a total of 2.3 to 2.8 molar equivalents of $NH_3$, based on the amount of compounds of the formula (II) used,
where the reaction is effected at a temperature in the range from 15° C. to 50° C., more preferably at a temperature in the range from 20° C. to 45° C.,
where preferably one, more than one or all of the following parameters are additionally applicable:
the reaction is effected without addition of ammonium chloride ($NH_4Cl$),
the $NH_3$ used is essentially anhydrous, and/or
the reaction is effected at an absolute pressure (pabs) of not more than 4 bar.

The process according to the invention for preparation of the mixtures comprising the phosphorus-containing α-aminonitriles of the formulae (Ia) and (Ib) is especially preferably applicable to the formulae (Ia) and (II) in which
$R^2$ is n-butyl, isobutyl, n-pentyl or isopentyl (preferably in turn n-butyl), and
$R^5$ is methyl,
using a total of 2.3 to 2.8 molar equivalents of $NH_3$, based on the amount of compounds of the formula (II) used,
where the reaction is effected at a temperature in the range from 20° C. to 45° C.,
the reaction is effected without addition of ammonium chloride ($NH_4Cl$),
the $NH_3$ used is essentially anhydrous, and
the reaction is effected at an absolute pressure (pabs) of not more than 4 bar.

The process according to the invention for preparation of the mixtures comprising the phosphorus-containing α-aminonitriles of the formulae (Ia) and (Ib) is very especially preferably applicable to the formulae (Ia) and (II) in which
$R^2$ is n-butyl, isobutyl, n-pentyl or isopentyl (preferably in turn n-butyl), and
$R^5$ is methyl,
using a total of 2.4 to 2.7 molar equivalents of $NH_3$, based on the amount of compounds of the formula (II) used,
where the reaction is effected at a temperature in the range from 20° C. to 45° C., the reaction is effected without addition of ammonium chloride ($NH_4Cl$), the $NH_3$ used is essentially anhydrous, and the reaction is effected at an absolute pressure (pabs) in the range of 970 mbar to 3 bar.

The process according to the invention can be conducted in an optional diluent.

Optional diluents usable are in principle water or various organic solvents that are inert under the reaction conditions. Preferably, the process according to the invention is conducted without use or addition of such diluents, with regard to the space-time yield as well (as already mentioned above).

The schematic diagram below in Scheme 1 illustrates the conversion of compounds of the formula (II) to compounds of the formulae (Ia) and (Ib), where $R^2$ and $R^5$ each have the definition given above, and the co-products (water and amide $R^5CONH_2$) and the secondary components (mainly alcohol $R^2OH$ and ester $R^5COOR^2$).

Scheme 1

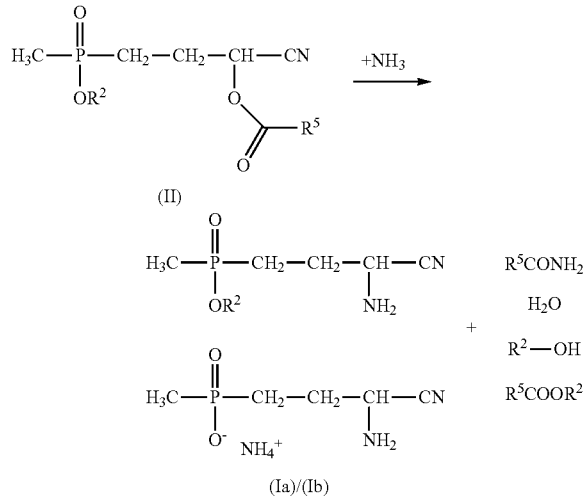

(II)

(Ia)/(Ib)

The process according to the invention can be conducted either in a batchwise process regime (for example in a semibatchwise mode of operation) or else in a continuous process regime (for example in a continuous stirred tank).

In the context of the present invention a continuous process regime shall be understood to mean that compounds (i.e. reactants such as compounds of the formula (II) and ammonia) are introduced into the reactor (input/feed) and, at the same time, but spatially separated therefrom, compounds (i.e. products such as compounds of the formulae (Ia) and (Ib)) are discharged from the reactor (discharge/drain).

In a batchwise process regime, by contrast, the steps of introducing reactants (i.e. compounds of the formula (II) and ammonia), conversion (i.e. reaction of the reactants) and discharging of the products (i.e. products such as compounds of the formulae (Ia) and (Ib)) from the reactor are effected consecutively or with overlap only in individual phases.

In a preferred configuration, the process according to the invention is conducted in semibatchwise mode, wherein the introduction of $NH_3$ is effected essentially with the reaction proceeding simultaneously to form mixtures comprising compounds of the formulae (Ia) and (Ib).

Glufosinate salts in the context of the present invention are preferably ammonium salts, phosphonium salts, sulfonium salts, alkali metal salts and alkaline earth metal salts of glufosinate, and salts of glufosinate with hydrohalic acids or sulfuric acid.

Especially preferred in the context of the present invention are glufosinate, glufosinate sodium and glufosinate ammonium, and glufosinate hydrochloride.

In a further aspect the present invention relates to the production of glufosinate

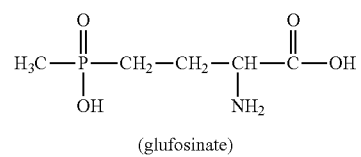

(glufosinate)

or glufosinate salts, wherein, in this process, a mixture comprising at least one compound of the formula (Ia) and at least one compound of the formula (Ib) is used

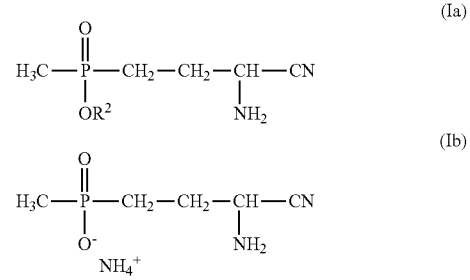

where $R^2$ has the meaning defined in accordance with the invention above, preferably the meaning defined as preferable above and more preferably the meaning defined as particularly preferable above, and this mixture used is prepared by the process according to the invention, preferably according to one of the configurations described as preferred or particularly preferred above.

The present invention further relates to a process for preparing glufosinate or glufosinate salts, especially glufosinate, glufosinate-sodium, glufosinate hydrochloride or glufosinate-ammonium, comprising the following steps (a) and (b):

(a) preparing a mixture comprising at least one compound of the formula (Ia) and at least one compound of the formula (Ib) as defined above in accordance with the invention, preferably as defined above as preferred, and more preferably as defined above as particularly preferred, this mixture being prepared by the process according to the invention, preferably in one of the configurations described as preferred or as particularly preferred above, and (b) converting the mixture prepared in step (a) and comprising at least one compound of the formula (Ia) and at least one compound of the formula (Ib) to glufosinate or to glufosinate salts, especially to glufosinate, glufosinate-sodium, glufosinate hydrochloride or glufosinate-ammonium, or (b) using the mixture prepared in step (a) and comprising at least one compound of the formula (Ia) and at least one compound of the formula (Ib) for preparation of glufosinate or of glufosinate salts, especially of glufosinate, glufosinate-sodium, glufosinate hydrochloride or glufosinate-ammonium.

The process according to the invention, preferably in one of the configurations described as preferred or as particularly preferred, for preparation of glufosinate or of glufosinate salts, is preferably conducted in such a way that, in step (b), an acidic hydrolysis of the nitrile group and the phosphinic ester group to compounds of the formula (Ia) and an acidic hydrolysis of the nitrile group to compounds of the formula (Ib) are effected, these hydrolyses preferably being effected with a mineral acid, and in turn preferably with aqueous HCl (hydrochloric acid).

This latter process step of the process according to the invention for preparation of glufosinate and/or glufosinate salts can be effected in a known manner as described, for example, in CN102399240A.

Finally, the present invention also relates to the use of a mixture prepared by a process according to the invention (preferably in one of the configurations described as preferred or as particularly preferred), in each case comprising at least one compound of the formulae (Ia) and (Ib), as defined above, for preparation of glufosinate or of glufosinate salts, especially of glufosinate, glufosinate-sodium, glufosinate hydrochloride or glufosinate-ammonium.

The examples which follow elucidate the present invention.

EXAMPLES

All data are based on weight unless otherwise stated.

Abbreviations Used

ACM: 3-[n-butoxy(methyl)phosphoryl]-1-cyanopropyl acetate, compound of the formula (II)

AMN: n-butyl (3-amino-3-cyanopropyl)methylphosphinate, compound of the formula (Ia)

Equipment: 500 ml autoclave with internal thermometer and jacket cooling, stirrer, optionally HPLC pump and IR probe (to monitor the reaction).

Example 1

The 500 ml autoclave purged with nitrogen gas was initially charged with 9.6 g of water and 9.3 g of ammonium chloride (corresponding to 0.45 molar equivalent, based on the amount of ACM used), and 57.8 g of aqueous ammonia solution (33% in water, corresponding to 2.9 molar equivalents, based on the amount of ACM used) was added while stirring (600 rpm). Subsequently, 100.92 g of ACM were pumped into the autoclave by means of an HPLC pump, in the course of which the internal temperature rose from initially 20° C. to about 22° C. After the addition of ACM had ended, the mixture was stirred for a further 20 minutes; no further change in the composition of the reaction mixture was recorded by IR probe.

According to $^{31}$P NMR, the proportion of the desired compounds of the formulae (Ia) and (Ib) was 90% (the ratio of the amounts of the compounds of the formulae (Ia) and (Ib) by NMR was 69:31).

$^{31}$P-NMR (162 MHz, D$_2$O): δ (ppm)=63.06/63.05 ppm (69%) and 42.91/42.84 ppm (31%).

Example 2

The water content of the NH$_3$ used was 0.2% to 0.25% by weight.

The 500 ml autoclave purged with NH$_3$ gas was initially charged with 252.9 g of ACM (ACM content: 92%) and, at 20° C., while stirring (800 rpm), 42.3 g of NH$_3$ gas (corresponding to 2.6 molar equivalents, based on the amount of ACM used) were passed into the autoclave within 22 minutes, in the course of which the internal temperature rose to 35° C. and was kept at 35° C. by means of jacket cooling. After 73 minutes, the reaction had ended; no further change in the composition of the reaction mixture was recorded by IR probe.

The reaction mixture from the autoclave was discharged into 400 ml of 32% hydrochloric acid and the resulting mixture was stirred at 110° C. for 7 h, in the course of which volatile components such as water, acetic acid, n-butyl chloride, n-butanol and n-butyl acetate were partly distilled off. This was followed by neutralization with aqueous ammonia solution. The content of glufosinate-ammonium in the solution obtained was 15.9%, corresponding to a yield of 91.5% of theory based on the amount of ACM used.

The determination of the content of glufosinate-ammonium was conducted from a sample neutralized with ammonium hydroxide solution by HPLC with glufosinate-ammonium as external standard and aqueous 0.1 molar KH$_2$PO$_4$ solution as eluent.

Example 3

The water content of the NH$_3$ used was 0.2% to 0.25% by weight.

A 0.5 l autoclave with jacket cooling was initially charged with 252.8 g of ACM (ACM content 90.7%), and the autoclave was purged with nitrogen. At an internal temperature of 22° C., about 8 g of gaseous NH$_3$ were injected into the solution without cooling while stirring (900 rpm). A temperature rise to 35° C. took place here. Subsequently, the internal temperature was controlled by closed-loop control via the jacket temperature at 33 to 35° C. (cooling via cryostat) and, within 38 minutes, about 34.4 g of NH$_3$ were added as a gas (42.4 g in total, corresponding to 2.6 equivalents). The maximum internal pressure was 3.5 bar absolute pressure (corresponding to 2.5 bar gauge). At internal temperature 34° C., stirring was continued for a further 96 min, and this reaction mixture was discharged into 507 g of hydrochloric acid (32% in water, corresponding to 4.6 equivalents) (cooling via a water bath). This mixture was then stirred under reflux for 7 h and about 200 ml of distillate were distilled off. The reaction mixture was then cooled down to 22° C. and brought to a pH of 6.5 with ammonia solution (25% in water) and diluted with water (total weight of the solution 1026.2 g; content (HPLC) of glufosinate-ammonium: 16.5%, corresponding to 97% of theory based on the amount of ACM used).

For isolation of glufosinate-ammonium, the procedure followed with the solution was similar to that described in CN102399240A in Example 7: For this purpose, the solution was concentrated, methanol was added, precipitated ammonium chloride was filtered off, and the mother liquor was concentrated under reduced pressure and stirred up once again with methanol and cooled down. The crystallized product was filtered off and washed with methanol. After drying, 192.8 g of solids were obtained (content (HPLC) of glufosinate-ammonium: 81.4%, corresponding to 90.3% of theory based on the amount of ACM used). To verify the content of glufosinate-ammonium, these solids were used to prepare a 50% by weight solution with water (content (HPLC) of glufosinate-ammonium: 40.9%, corresponding to 90.6% of theory).

$^{31}$P-NMR (162 MHz, D$_2$O): δ (ppm)=56 ppm.

The invention claimed is:

1. A process for preparing a mixture comprising at least one compound of the formula (Ia) and at least one compound of the formula (Ib)

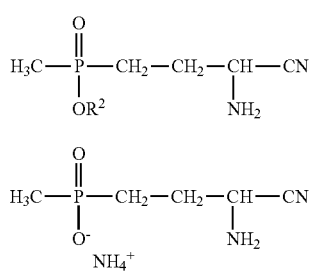

wherein a compound of the formula (II)

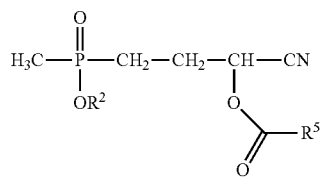

is reacted with NH$_3$, using a total of 2.0-3.5 molar equivalents of NH$_3$, based on the amount of compounds of the formula (II) used, where in each case:
R$^2$ is (C$_1$-C$_{12}$)-alkyl, (C$_1$-C$_{12}$)-haloalkyl, (C$_6$-C$_{10}$)-aryl, (C$_6$-C$_{10}$)-haloaryl, (C$_7$-C$_{10}$)-aralkyl, (C$_7$-C$_{10}$)-haloaralkyl, (C$_4$-C$_{10}$)-cycloalkyl or (C$_4$-C$_{10}$)-halocycloalkyl,
R$^5$ is (C$_1$-C$_{12}$)-alkyl, (C$_1$-C$_{12}$)-haloalkyl, (C$_6$-C$_{10}$)-aryl, (C$_6$-C$_{10}$)-haloaryl, (C$_7$-C$_{10}$)-aralkyl, (C$_7$-C$_{10}$)-haloaralkyl, (C$_4$-C$_{10}$)-cycloalkyl or (C$_4$-C$_{10}$)-halocycloalkyl.

2. The process of claim 1, wherein
R$^2$ is (C$_3$-C$_6$)-alkyl,
R$^5$ is (C$_1$-C$_4$)-alkyl, (C$_6$-C$_8$)-aryl or (C$_5$-C$_8$)-cycloalkyl.

3. The process of claim 1, wherein
R$^2$ is (C$_4$-C$_5$)-alkyl,
R$^5$ is methyl, ethyl or isopropyl.

4. The process of claim 1, wherein a total amount of 2.0 to 3.0 molar equivalents of NH$_3$ is used, based on the amount of compounds of the formula (II) used.

5. The process of claim 1, wherein a total amount of 2.3 to 2.8 molar equivalents of NH$_3$ is used, based on the amount of compounds of the formula (II) used.

6. The process of claim 1, wherein the NH$_3$ used is essentially anhydrous and the water content in the NH$_3$ used is not more than 1% by weight.

7. The process of claim 1, wherein the reaction is effected without addition of ammonium chloride (NH$_4$Cl).

8. The process of claim 1, wherein one or more compounds of the formula (II) as defined in claim 1 are initially charged in liquid form, and NH$_3$ is added thereto.

9. The process of claim 1, wherein the reaction is effected at a temperature in the range from 0 to 70° C.

10. The process of claim 1, wherein the reaction is effected at a temperature in the range from 15 to 50° C.

11. The process of claim 1, wherein the reaction is effected at an absolute pressure of not more than 5 bar.

12. A process for preparing glufosinate

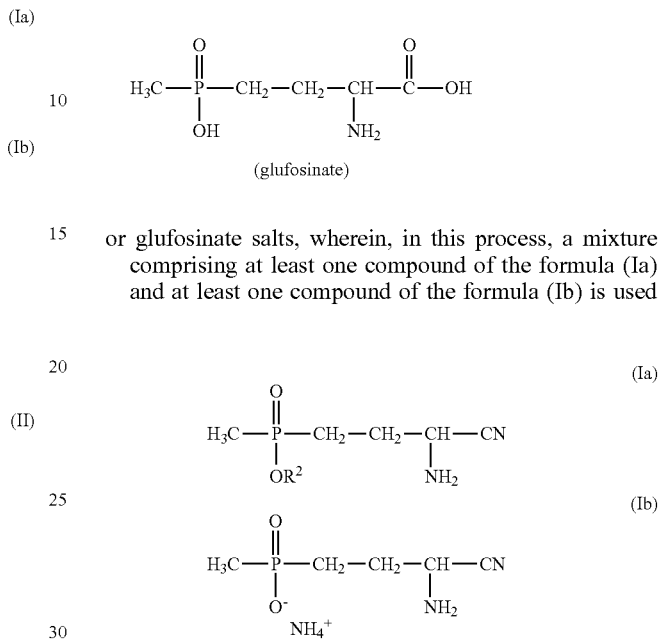

where R$^2$ has the definition given in claim 1, and the mixture is prepared by the process of claim 1.

13. A process for preparing glufosinate or glufosinate salts comprising the following steps (a) and (b):
(a) preparing a mixture prepared by a process in claim 1 and comprising at least one compound of the formula (Ia) and at least one compound of the formula (Ib) as defined in claim 1, and
(b) converting the mixture prepared in step (a) and comprising at least one compound of the formula (Ia) and at least one compound of the formula (Ib) to glufosinate or to glufosinate salts.

14. The process of claim 13, wherein, in step (b), an acidic hydrolysis of the nitrile group and the phosphinic ester group of the compound of formula (Ia) and an acidic hydrolysis of the nitrile group of the compound of formula (Ib) are effected.

15. The process of claim 1, wherein the reaction is effected at a temperature in the in the range from 10 to 60° C.

16. The process of claim 1, wherein the reaction is effected at a temperature in the range from 20 to 45° C.

17. The process of claim 1, wherein the reaction is effected at an absolute pressure of not more than 4 bar.

18. The process of claim 1, wherein the reaction is effected at an absolute pressure in the range from 970 mbar to 3 bar.

19. The process of claim 14, wherein the hydrolyses are effected with a mineral acid.

20. The process of claim 19, wherein the mineral acid is aqueous HCl (hydrochloric acid).

* * * * *